C. C. WORTHINGTON.
LAWN MOWING APPARATUS.
APPLICATION FILED AUG. 22, 1916.

1,293,287.

Patented Feb. 4, 1919
2 SHEETS—SHEET 1.

Inventor
Charles C Worthington
By
Attorney

C. C. WORTHINGTON.
LAWN MOWING APPARATUS.
APPLICATION FILED AUG. 22, 1916.
1,293,287.
Patented Feb. 4, 1919.
2 SHEETS—SHEET 2.
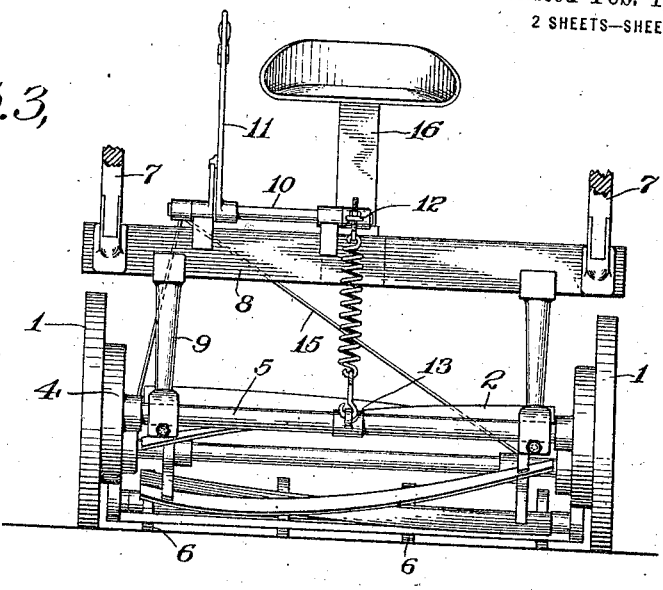
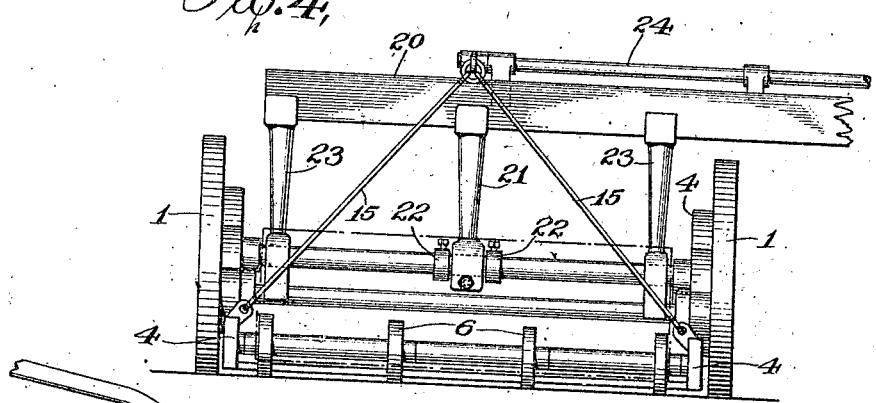
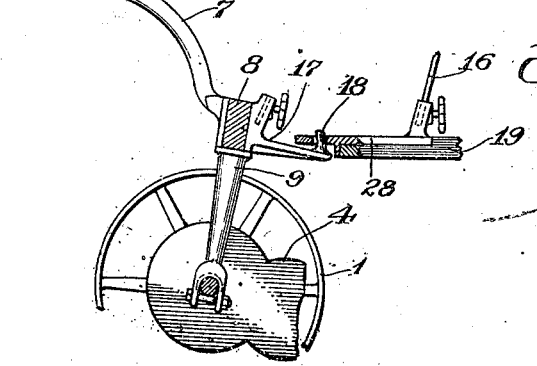
Clarks C. Worthington
Inventor
Attorney

UNITED STATES PATENT OFFICE.

CHARLES C. WORTHINGTON, OF DUNNFIELD, NEW JERSEY.

LAWN-MOWING APPARATUS.

1,293,287.　　　　　Specification of Letters Patent.　　Patented Feb. 4, 1919.

Application filed August 22, 1916. Serial No. 116,238.

*To all whom it may concern:*

Be it known that I, CHARLES C. WORTHINGTON, a United States citizen, residing in Dunnfield, New Jersey, have invented the following-described Improvements in Lawn-Mowing Apparatus.

Figure 1:
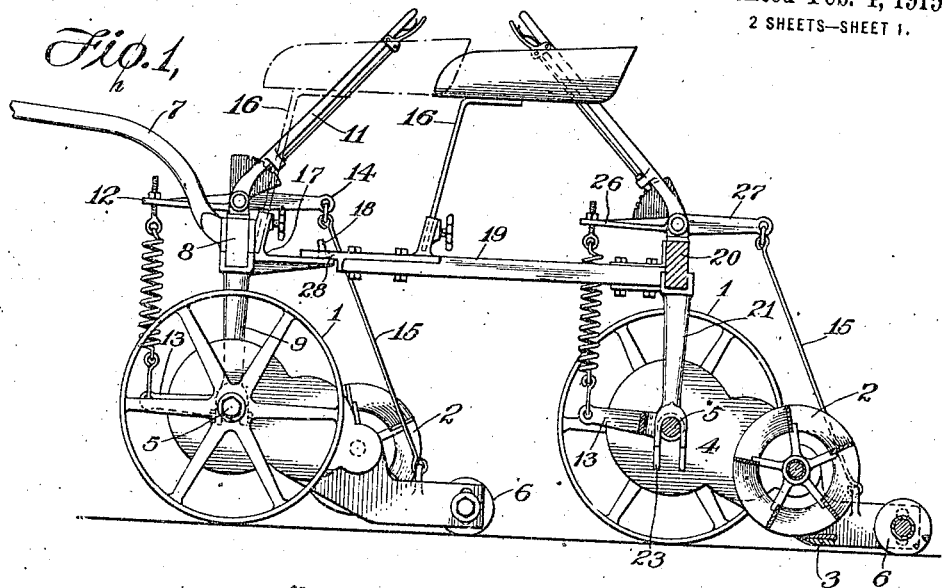
Figure 2:
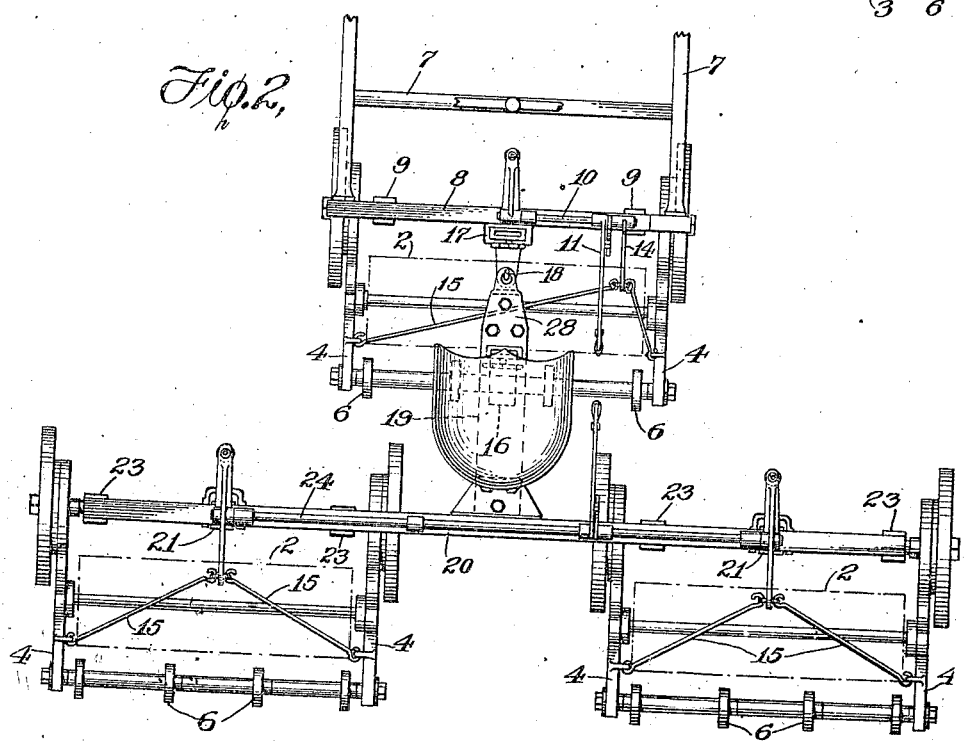

The invention provides a lawn mowing apparatus which can be readily converted from a single-cut, narrow swath machine to a multiple-cut, wide swath machine, the single machine being suited for mowing in constricted places and adapted to carry the operator if necessary, and the multiple machine, comprising a gang of mower units and being articulated in respect to the frame-work connecting the same, whereby its wide swath is properly accommodated to ground undulations without overloading any of the units or any of the ground wheels thereof, such gang machine being also adapted for carrying the operator if desired, and in such manner as to distribute his weight upon the several units of the gang. The invention consists in the manner of organization of the multiple units and in the structure of the said single machine and also in the various combinations and details hereinafter explained and more particularly pointed out in the claims In the accompanying drawings:

Figure 1 is a side elevation with parts in section of a machine embodying the present invention;

Fig. 2 being a plan view thereof;

Fig. 3 a front view of the front unit;

Fig. 4 a rear view of one of the rear units; and

Fig. 5 a detail of the connection between the front units and the trailer section.

The gang machine comprises three lawn mower units, one in front and two in rear arranged so that their several swaths slightly overlap and the total swath cut is therefore substantially equal to the aggregate of the individual swaths. Each unit is or may be identical with the others and of a common type of construction. As shown herein the unit comprises a pair of ground engaging wheels or wheel members 1, driving a cutter reel 2 which revolves against a dead knife 3 in the familiar manner. The cutter reel is journaled in the two side plates 4, one or both of which contains and conceals the gear trains which drive it and said plates are rigidly connected together by the cross-rod 5 and the dead knife structure, forming therewith the frame of the mower unit. The forward end of this mower frame is carried on the ground wheels and the rear end is free to swing vertically about the axis of the ground wheels being normally supported as usual by the adjustable rear rollers 6 which are journaled at the rear ends of the side plates.

The front mower unit carries a framework, which for convenience I term a sulky frame, inasmuch as it is designed to be sustained in its normal position partly by means of the horse-shafts 7 which extend rigidly forward from it in a sulky. This framework is made up of a cross-piece 8 rigidly bolted to two depending forked posts 9 which straddle the cross-rod 5 by their lower ends and at points near the ends of the cross-rod. These posts may be confined to the cross-rod by bolts or in any other way not preventing the vertical swinging of the cutter mechanism as above explained. The draft means 7 is secured preferably to the cross-piece 8, with appropriate braces, and an operator's seat, shown in dotted lines, in Fig. 1 is mounted at the center of the cross-piece and at the desired distance in rear of the cross-rod 5 to give the entire structure the proper sulky balance. The cross-rod 5 in the present case happens to coincide with the axis of the ground wheels and is therefore treated as the axle of such wheels, being also the axle of the sulky, the ground wheels of the mower being the wheels of the sulky. The sulky frame carries a rock shaft 10 controlled by a latch-and-segment lever 11, at the side of the operator's seat, and a forwardly projecting arm 12 on this shaft is connected by an adjustable spring to a forward arm 13 fixed on the frame of the mower unit, so that when the lever is thrown rearward to put the spring under tension, the cutter mechanism is firmly but yieldingly pressed toward the ground. The rear arm 14 on the rock shaft, is connected by a link bridle 15 with the rear part of the mower frame so that the opposite motion of the lever may lift the cutter any desired extent above the ground,—either completely out of cutting relation, or high enough to cut the so-called "low rough" of a golf course.

The flexible post 16 of the operator's seat is adapted to be removably held in a socket in a casting 17, bolted to the cross-piece 8 and preferably secured in such socket by a hand-wheel set-screw to guard against accidental displacement. The same casting carries a rearward extension terminating in a short and slightly curved upstanding hook 18, which is a part of the connecting means whereby the trailer units can be operatively assembled with the sulky unit whenever desired.

The trailer units are held properly spaced and guided by a trailer frame which comprises a central tongue 19 rigidly braced to a cross-beam 20, the latter being directly supported upon and parallel with the wheel axes of the two rear units by means of two posts 21, one of which is central to the frames of each of said units. These posts 21, are rigidly bolted to the cross-beam and rest by their crotched ends on the centers of the cross-rods 5, between the collars 22 thereon, thus forming simple rocker joints with the units, the purpose of which is to permit the rear units to swing or tilt in the vertical planes of their own axles, as required by the ground contour, and independently of the other units in the gang, and the said joints are centralized on the units in order to distribute the weight of the superposed frame-work equally to each ground wheel during such tilting. It will be evident however that various other forms of connection with the units can be used to produce a similar result, the principal object being to permit a proper accommodation of the rear units to the ground contour. The forked posts 23 on opposite sides of these central bearings straddle the axle rod 5 near the ground wheels without vertical bearing thereon and serve merely as guides to keep the units true to the frame as they tilt, and to relieve the central bearing posts 21 of twisting strains.

The trailer frame carries a rock-shaft 24 controlled by a latch-and-segment lever alongside of the operator's seat and the said shaft is equipped with a forward arm 26 like the arm 12, and a rear arm 27, like the arm 14 for each unit, the forward arms being connected by springs with the arms 13 of the units and the rear arms to the bridles 15 by which the units are lifted. It will be observed that the latch lever applies spring pressure simultaneously to both the rear cutters, or lifts them from the ground, according to the direction of its operation.

The forward end of the tongue 19 is equipped with a connection piece 28 having a vertical perforation in its flattened end to fit the hook 18, but with sufficient looseness to constitute a joint in the nature of a universal joint, and which will not only permit the trailer section to swing to the right or left when turning corners, but also to twist or turn on a horizontal axis, relatively to the front section, thus enabling the front unit to tilt in the vertical plane of its own axle entirely independent of the horizontal position of the trailer and, vice versa, allowing the trailer framework to take any angle called for without affecting the accommodation of the front unit to the contour of the ground it rests upon. By virtue of this joint and the rocker joints above described, all three units gain continuous and equal traction for all of their ground wheels regardless of the irregularity of the lawn. It will be plain, that while a hook and eye connection constitutes a suitable and practicable form of framework articulation for the purpose stated, having also the advantage of quick detachability, it is by no means the only form possible and various other styles of universal connection may be substituted for it within the invention whether the detachment of the frame sections is made at the joint or elsewhere. The hook 18 is curved enough to avoid unintentional disconnection when the machine is in operation or when backing but by slightly raising the horse shafts, it can be withdrawn from the eye as suggested in Fig. 5. When in the normal position, of Fig. 1, the parts are substantially interlocked. When the trailer frame is connected to the front unit, the operator's seat is, or may be, inserted and secured in the socket of the connection fitting 28 as indicated in Fig. 1 and the same as described in connection with the sulky unit, the operator's weight being thus distributed, substantially equally, to each of the three units. For such work as mowing in and around bushes and in narrow places, the seat is set in the forward socket and the trailer frame and rear units are disconnected from the front unit and the latter is then used as a single sulky mower.

Claims:

1. Lawn mowing apparatus comprising in combination, a lawn-mower having a frame provided with a rotary cutter, said frame being mounted upon cutter-driving ground-wheels and adapted to swing vertically about the axis of said wheels, a sulky frame carried by said lawn-mower and provided with draft means which support it in normal upright position and a seat for the operator, said sulky frame being pivotally related to said mower frame whereby the latter may swing with relation thereto.

2. Lawn mowing apparatus comprising a lawn mower frame provided with a rotary cutter and mounted on cutter-driving ground-wheels and adapted to swing vertically about the axis of said wheels, in combination with a sulky frame carried by said ground wheels provided with an operator's seat and pivotally related to said mower frame, draft means supporting said sulky frame and seat in upright position independent of the swinging movement of the mower frame and means supplementing the weight of the mower frame for pressing the same toward the ground.

3. Lawn mowing apparatus comprising a lawn mower frame provided with a rotary cutter and mounted on cutter-driving ground wheels and adapted to swing vertically about the axis thereof, in combination with a sulky frame carried by said ground wheels and pivotally related to said mower frame and comprising a cross beam located above the same, an operator's seat mounted on said cross beam, draft means supporting said frame and seat in upright position and control means supported on said cross beam whereby the operator may swing said mower frame upwardly from the ground.

4. Lawn mowing apparatus comprising a front lawn mower unit provided with a rotary cutter and mounted on cutter-driving ground-wheels, a sulky frame pivotally mounted on the same ground wheels and draft means supporting the sulky frame in normal upright position above the front unit in combination with trailer mower units flexibly connected to said sulky frame.

5. Lawn mowing apparatus comprising a lawn mower frame provided with a rotary cutter and mounted on cutter-driving ground wheels and adapted to swing vertically about the axis of said wheels, in combination with a sulky frame carried on said ground wheels, draft means supporting said sulky frame in normal upright position, independently of the vertical swinging of said mower frame, a trailer frame flexibly joined to said sulky frame and lawn mower units supporting said trailer frame, said units being independently free in said frame to accommodate undulations of the surface to be mowed.

6. Lawn mowing apparatus comprising a mower unit having a rotary cutter and carried on cutter-driving ground-wheels and adapted to swing vertically about the axis of said wheels, a sulky frame carried by said ground wheels and supported in normal upright position by the draft means of said unit and means connected to said sulky frame and mower unit for resiliently pressing the mower frame toward the ground.

7. Lawn mowing apparatus comprising a front mower unit and a rotary cutter and carried on cutter-driving ground-wheels and adapted to swing vertically about the axis thereof, a sulky frame having draft means and carried by said wheels and held in upright position by said draft means and trailer mower units detachably and flexibly connected to said front unit and independently free to accommodate undulations in the ground to be mowed.

8. Lawn mowing apparatus comprising a front mower unit having a rotary cutter and carried on cutter-driving ground-wheels and adapted to swing vertically about the axis thereof, a sulky frame also carried by said ground wheels and draft means supporting the same in upright position, in combination with a trailer frame, rear mower units supporting the same and spring means between the several units and their respective frames for urging the cutters thereof toward the ground.

9. The combination of a frame having draft means which support it in normal working position, a lawn mower also supporting said frame and comprising a mower frame carrying a cutter reel free to swing vertically on the axis of the ground wheels of said lawn mower and trailer mowers detachably connected to said mower by means permitting all three mowers to accommodate undulations of the surface to be mowed.

10. Combination lawn mowing apparatus comprising front and rear mower units each carrying a frame structure, an operator's seat and means for interchangeably supporting said seat on the frame structure of the front or rear units.

11. Combination lawn mowing apparatus comprising a front sulky-type mower provided with an operating member to control the cutter thereof and a trailer frame flexibly connected to said front mower and having an operating member controlling the cutter mechanism of the mower units thereof.

In testimony whereof, I have signed this specification.

CHARLES C. WORTHINGTON.